Oct. 23, 1945.  G. E. HAMILTON  2,387,442
DEVICE FOR VISUAL TRAINING
Filed Sept. 11, 1943

Inventor,
George E. Hamilton,
By Frank S. Appleman
Attorney.

Patented Oct. 23, 1945

2,387,442

UNITED STATES PATENT OFFICE 2,387,442

DEVICE FOR VISUAL TRAINING

George E. Hamilton, Meadville, Pa., assignor to Keystone View Company, a corporation of Pennsylvania Application September 11, 1943, Serial No. 502,029

5 Claims. (Cl. 88—20)

This invention relates to visual training, and comprises a method of and means for stimulating vision with regard to convergence when fixation changes from one pair of pictures that has a wide separation of the pair, to a pair that has a smaller separation, and it is the purpose to furnish an additional stimulation to relaxation of convergence when fixation is changed from the pictures that are closer together to those that are further apart. The invention is effective only when it is possible for the patient to fuse stereoscopic pairs of pictures referred to.

As an aid to determining the improvement which may be accorded the invention over any vision training stereographs of similar character now in use, it may be stated that in any stereographs as used in a stereoscope, the separation between the centers of the stereoscopic pair of pictures determines the amount of convergence necessary for fusion of the two pictures into one apparent picture. For every stereoscope there is a separation such that when the two pictures are fused into one, the optical axes of the eyes are parallel just as they are when looking at a distant object without the aid of an instrumentation. If a small pair of pictures is placed, for example, at the top of a stereograph having this separation and beneath these another stereoscopic pair is placed having a separation less than the upper ones, when fixation changes from the upper picture to the lower picture, the eyes must converge if fusion is attained on the lower picture, the amount of convergence depending upon the amount of difference between the separation of the two stereoscopic pairs. It is evident that a great variety of separations can be obtained by making a series of stereographs of this kind. It is not necessary for one pair to be at the equivalent of infinity. Both pairs may require convergence, one pair requiring merely more convergence than the other. One pair may require an actual divergence, while the other requires convergence, or both pairs may require divergence in varying degrees. These are all useful in vision training, since many persons have eyes which tend to diverge too far or to converge too far, the result being discomfort and imperfect binocular vision. By the use of such stereographs, many such persons have been able to adjust their eyes to normal binocular seeing.

It has formerly been the practice to mount stereoscopic pairs above referred to with a small space between the upper and lower pairs and without any device such as the diagonal lines calculated to stimulate or make easier convergence or divergence when fixation changes from one pair to the other pair. The result of such an arrangement is that when fixation is held upon one stereoscopic pair, it is properly fused into apparently a single picture, while the other stereoscopic pair appears to be double. When the change of fixation takes place from the fused pair to the double pair, a more or less conscious effort must be made to bring the two pictures into the appearance of one picture. The fact that the patient knows that the two pictures should be seen as one assists in this conscious effort.

In the stereographs made embodying the device covered by this application, lines are drawn from the lower corners of the upper pair of pictures to the upper corners of the lower pair of pictures in such a way that the eyes can follow the lines with less conscious effort to bring the two pictures together than would be exercised if the lines were not there. Unless the separations are greatly exaggerated, one pair of pictures does not seem to be double while the other is single as described in the preceding paragraph, but both pairs of pictures may be seen as single, the pair with the narrower separation being apparently nearer to the patient than the pair with the wider separation. This effect depends upon the patient's appreciation of stereopsis or depth perception, a phenomenon not possessed by all persons.

The device referred to in this application supplies stimulus to convergence or divergence. A secondary effect that may or may not be apparent is the effect of stereopsis or depth perception.

From a consideration of the foregoing, it is obvious that an object of the invention is to provide stereoscopic pairs of pictures of objects which may consist preferably of two stereoscopic pairs mounted on the same card, carrier or lantern slide, which will be hereinafter referred to as a "card," and in which the lower pair of pictures is placed closer together than the upper pair, since in stereographs those pictures which appear to be nearer to the eyes are actually closer together in the stereoscopic pair of pictures than those which are interpreted stereoscopically as further away.

It is furthermore an object of the invention to connect the upper pair of pictures with the lower pair of pictures by the use of diagonally disposed lines for the purpose of aiding the patient in obtaining the impression that the lower pictures, when the views are fused, are nearer than the upper pictures, the foregoing being known in the art or trade as a "jump duction device."

With the foregoing and other objects in view, the invention consists in means for testing vision, to be hereinafter more fully set forth and claimed.

In describing the invention in detail, reference will be had to the accompanying drawing forming part of this application, in which.

Figure 1:
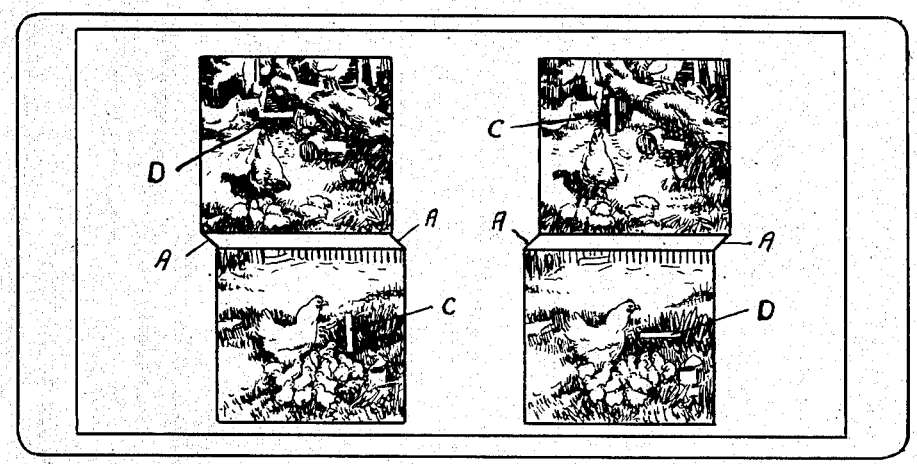
Figure 1 illustrates a stereograph embodying one form of the invention.
Figure 2:
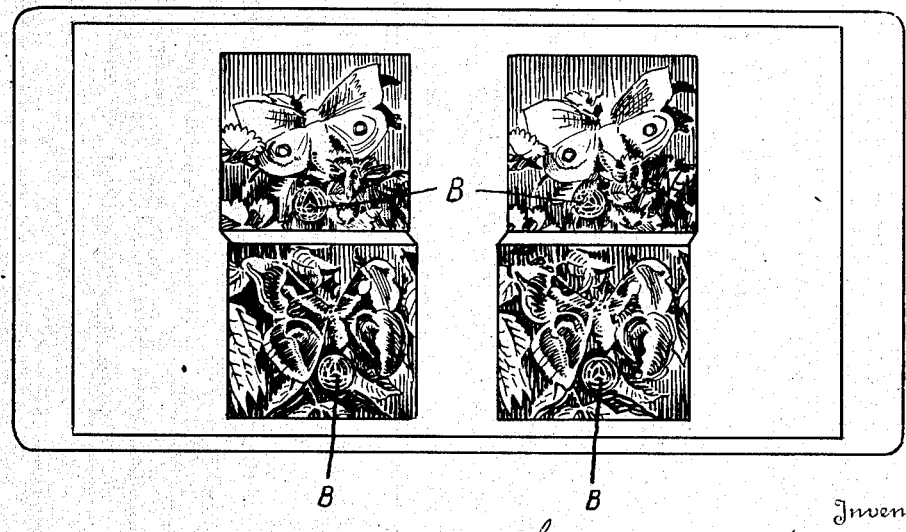
Figure 2 illustrates a view of somewhat similar nature.

In this drawing the shelf-like projection is regarded as a control mark and insures that the patient is aware that the lower picture is nearer than the upper picture. With the old type jump-duction slides, it was difficult to determine accurately if the patient was aware of this difference in distance between photographs, but these shelf-like projections A, A definitely place the upper photographs or pictures on a level further away from the patient than those of the lower pictures. Additionally, in Figure 2 a geometric design or control mark B is shown on each of the pictures that aids in the coordination of the two eyes by inducing rapid fusion and giving the operator of the test reliable information as to whether or not the patient possesses third degree fusion or stereopsis. Other cross control marks C and D appear on the pictures of Fig. 1, the vertical lines C appearing as crossing the horizontal lines D when focused.

From what has been illustrated and described, it is obvious that the lines connecting the upper and lower pictures are intended to aid the observer in shifting the gaze from the near picture to the far picture which requires an ocular adjustment similar to that in shifting the gaze from a near object to a far object, but with additional divergence. The lines connecting the upper and lower pictures described as defining a shelf aid the patient in making the shift from one picture to the other without breaking stereopsis. With the additional divergence, this is particularly important, especially in the case of a patient with less ocular skill or control than normal.

I claim:

1. A device for visual training comprising a card having thereon a pair of spaced upper stereoscopic pictures and a pair of lower stereoscopic pictures spaced below the upper stereoscopic pictures and at a less distance apart than the upper pictures, and said card having inwardly converging lines extending from the lower corners of the upper pictures to the upper corners of the lower pictures, said pictures having indicators thereon merging when both eyes are used in observing the pictures through a stereoscope.

2. A device for visual training comprising a card having thereon a pair of spaced upper stereoscopic pictures and a pair of lower stereoscopic pictures spaced below the upper stereoscopic pictures and at a less distance apart than the upper pictures, and said card having inwardly converging lines extending from the lower corners of the upper pictures to the upper corners of the lower pictures, said pictures having indicators thereon merging when both eyes are used in observing the pictures through a stereoscope, when viewed through a stereoscope said upper pictures requiring no fusional convergence while the lower pictures require a desired dioptric extent of positive fusional convergence.

3. A device for visual training comprising a card having thereon a pair of spaced upper stereoscopic pictures and a pair of lower stereoscopic pictures spaced below the upper stereoscopic pictures and at a less distance apart than the upper pictures, and said card having inwardly extending lines leading from the lower corners of the upper pictures to the upper corners of the lower pictures, the said extending lines depicting a simulated shelf between the upper and lower pictures of each pair.

4. A device for visual training comprising a card having thereon a pair of spaced upper stereoscopic pictures and a pair of lower stereoscopic pictures spaced below the upper stereoscopic pictures, and at a less distance apart than the upper pictures, and said card having inwardly extending lines leading from the lower corners of the upper pictures to the upper corners of the lower pictures, when viewed through a stereoscope, the said extending lines depicting a simulated shelf between the upper and lower pictures of each pair, whereby varying different fusional relationships are created between the upper and lower pictures, allowing desired dioptric extents of positive fusional convergence.

5. A device for visual training comprising a card having thereon a pair of spaced upper stereoscopic pictures and a pair of lower stereoscopic pictures spaced below the upper stereoscopic pictures and at a less distance apart than the upper pictures, and said card having inwardly etxending lines leading from the lower corners of the upper pictures to the upper corners of the lower pictures, the said extending lines depicting a simulated shelf between the upper and lower pictures of each pair, said pictures having indicators thereon merging when both eyes are used in observing the pictures through a stereoscope.

GEORGE E. HAMILTON.